US010727752B2

(12) United States Patent
Romanov et al.

(10) Patent No.: US 10,727,752 B2
(45) Date of Patent: Jul. 28, 2020

(54) DEVICE FOR PRODUCING CONSTANT VOLTAGE (VARIANTS)

(71) Applicant: CLOSED-UP JOINT-STOCK COMPANY DRIVE, Novosibirsk (RU)

(72) Inventors: Yuriy Igorevich Romanov, Novosibirsk (RU); Stanislav Vladimirovich Maletskiy, Novosibirsk (RU)

(73) Assignee: Closed-Up Joint-Stock Company Drive, Novosibirsk (RU)

( * ) Notice: Subject to any disclaimer, the term of this patent is extended or adjusted under 35 U.S.C. 154(b) by 0 days.

(21) Appl. No.: 16/293,873

(22) Filed: Mar. 6, 2019

(65) Prior Publication Data

US 2019/0267904 A1    Aug. 29, 2019

Related U.S. Application Data

(62) Division of application No. 15/757,180, filed as application No. PCT/RU2015/000571 on Sep. 9, 2015, now Pat. No. 10,320,302.

(51) Int. Cl.
| | |
|---|---|
| *H02M 3/335* | (2006.01) |
| *G05F 1/59* | (2006.01) |
| *H02M 1/15* | (2006.01) |
| *H02M 3/158* | (2006.01) |

(52) U.S. Cl.
CPC .......... *H02M 3/33523* (2013.01); *G05F 1/59* (2013.01); *H02M 1/15* (2013.01); *H02M 3/158* (2013.01)

(58) Field of Classification Search
CPC .... H02M 2001/006; H02M 2001/0032; G05F 1/46
See application file for complete search history.

(56) References Cited

U.S. PATENT DOCUMENTS

| | | | | |
|---|---|---|---|---|
| 4,063,307 A * | 12/1977 | Stephens | .............. | H02H 7/1213 363/21.17 |
| 4,383,293 A * | 5/1983 | Randall | ............... | H02M 3/3376 363/17 |
| 4,400,767 A * | 8/1983 | Fenter | ............... | H02M 3/33523 363/21.15 |
| 4,439,820 A * | 3/1984 | Kuhn | ................ | H02M 3/33507 340/663 |
| 5,381,327 A * | 1/1995 | Yan | ................... | H02M 3/33576 363/24 |
| 5,973,936 A * | 10/1999 | Lenz | ........................ | G05F 1/46 323/285 |
| 6,313,616 B1 * | 11/2001 | Deller | ..................... | G05F 1/575 323/282 |
| 6,370,045 B1 * | 4/2002 | Lurkens | .................. | H02M 1/10 323/299 |

(Continued)

*Primary Examiner* — Yusef A Ahmed
(74) *Attorney, Agent, or Firm* — Preston Smirman; Smirman IP Law, PLLC (57) ABSTRACT

The proposed variant devices are intended for producing a highly stable constant voltage in a wide range of output voltages. A highly stable constant voltage is produced by generating a control signal which adjusts the relative pulse duration as a constant voltage is converted into a pulse voltage, taking into account a constant voltage setpoint value in the load, while also stabilizing a constant current and reducing the pulse components in the constant current through the use of negative feedback.

1 Claim, 4 Drawing Sheets

(56) References Cited

U.S. PATENT DOCUMENTS

| | | | | |
|---|---|---|---|---|
| 6,445,598 B1* | 9/2002 | Yamada | .............. | H02M 3/33507 |
| | | | | 363/21.12 |
| 6,944,034 B1* | 9/2005 | Shteynberg | .......... | H02M 1/4258 |
| | | | | 323/282 |
| 9,595,875 B2* | 3/2017 | Lu | ..................... | H02M 3/33523 |
| 2002/0067629 A1* | 6/2002 | Koike | ............... | H02M 3/33523 |
| | | | | 363/97 |
| 2004/0218405 A1* | 11/2004 | Yamada | ................ | H02M 3/335 |
| | | | | 363/18 |
| 2005/0146901 A1* | 7/2005 | Yamada | ............. | H02M 3/33523 |
| | | | | 363/21.01 |
| 2005/0248965 A1* | 11/2005 | Yamada | ............. | H02M 3/33523 |
| | | | | 363/21.08 |
| 2006/0066264 A1* | 3/2006 | Ishigaki | ............... | H05B 41/282 |
| | | | | 315/291 |
| 2010/0182808 A1* | 7/2010 | Sato | .................. | H02M 3/33592 |
| | | | | 363/21.18 |
| 2012/0243271 A1* | 9/2012 | Berghegger | ...... | H02M 3/33507 |
| | | | | 363/21.15 |
| 2015/0198963 A1* | 7/2015 | Romanov | ............ | H02M 3/156 |
| | | | | 323/312 |
| 2017/0083032 A1* | 3/2017 | Romanov | ............... | G05F 1/563 |
| 2017/0244332 A1* | 8/2017 | Leong | ............... | H02M 3/33523 |
| 2018/0109182 A1* | 4/2018 | Romanov | ............. | H02M 3/156 |

* cited by examiner

DEVICE FOR PRODUCING CONSTANT VOLTAGE (VARIANTS)

CROSS-REFERENCE TO RELATED APPLICATION

The instant application is a Division of U.S. patent application Ser. No. 15/757,180 filed Mar. 2, 2018, pending, and is a national phase of PCT International Application No. PCT/RU2015/000571 filed Sep. 9, 2015, the entire specifications of both of which are expressly incorporated herein by reference.

FIELD OF THE INVENTION

The proposed technical solutions concern the field of electrical engineering, and may be used to create sources of DC voltage that ensure stable DC voltage on a load in a broader range of output voltage, with a substantial reduction in the magnitude of the pulsed component in the output voltage and output current.

BACKGROUND OF THE INVENTION

Analogous technical solutions are known from the prior art, see, e.g., the description of USSR patent no. 1229742, which contains the following combination of essential features:
 a rectifier (DC voltage source);
 a DC-pulse voltage converter, the inputs of which are connected to the outputs of the DC voltage source;
 a pulse voltage-DC converter, the inputs of which are connected to the outputs of the DC-pulse voltage converter (DLC filter);
 a first resistive voltage divider, the corresponding outputs of which are connected to the outputs of the DLC filter;
 a line stabiliser, the inputs of which are connected to the outputs of the pulse voltage-DC converter;
 a second resistive voltage divider, one of the outputs of which is connected to the output of the line stabiliser and the other output of which is connected to the negative output of the DC voltage source;
 a load, the first output of which is connected to the output of the line stabiliser and the second output of which is connected to the negative output of the DC voltage source;
 a control circuit, the first input of which is connected to the output of the DC output voltage selector, the second input of which is connected to the output of the second resistive voltage divider, and the output of which is connected to the control input of the DC-pulse voltage converter.

The following features are common to the first proposed embodiment of the device for obtaining DC voltage and the above-described analogous technical solution:
 a DC voltage source;
 a DC-pulse voltage converter, the inputs of which are connected to the outputs of the DC voltage source;
 a pulse voltage-DC converter, the corresponding inputs of which are connected to the corresponding outputs of the DC-pulse voltage converter;
 a DC output voltage selector (first resistive divider), the corresponding outputs of which are connected to the outputs of the pulse voltage-DC converter;
 a control circuit, the first input of which is connected to the output of the DC voltage output selector and the output of which is connected to the control input of the DC-pulse voltage converter.

The following features are common to the second proposed embodiment of the device for obtaining DC voltage and the above-described analogous technical solution:
 a DC voltage source;
 a DC-pulse voltage converter, the inputs of which are connected to the outputs of the DC voltage source;
 a pulse voltage-DC converter;
 a DC output voltage selector, the corresponding outputs of which are connected to the outputs of the DC-pulse voltage converter;
 a control circuit, the first input of which is connected to the output of the DC output voltage selector.

An analogous technical solution is also known, see U.S. Pat. No. 6,747,420B2, selected as the closest prior art, for a prototype comprising the following combination of essential features:
 a DC voltage source;
 a DC-pulse voltage converter, the inputs of which are connected to the outputs of the DC voltage source;
 a pulse voltage-DC converter having a positive output for connection to one of the outputs of the load, and the inputs of which are connected to the outputs of the DC-pulse voltage converter;
 a load, one of the outputs of which is connected to the positive output of the pulse voltage-DC converter;
 a regulator, one output of which (the first input) is intended for connection to the other output of the load;
 a proportional regulator, one output of which is connected to the control (second) input of the regulator;
 a DC output voltage selector, the corresponding outputs of which are connected to the outputs of the DLC filter;
 a control circuit, the first input of which is connected to the output of the DC output voltage selector, the second input of which is connected to the output of the regulator, and the output of which is connected to the control input of the DC-pulse voltage converter.

The following features are common to the first proposed embodiment and the prototype:
 a DC voltage source;
 a DC-pulse voltage converter, the input of which is connected to the outputs of the DC voltage source;
 a pulse voltage-DC converter having a positive output for connection to one of the outputs of the load, and the corresponding inputs of which are connected to the corresponding outputs of the pulse voltage-DC converter;
 a regulator, one output of which (the first input) is intended for connection to the other output of the load;
 a proportional regulator, one output of which is connected to the control (second) input of the regulator;
 a DC output voltage selector, the corresponding outputs of which are connected to the outputs of the DLC filter;
 a control circuit, the first input of which is connected to the output of the DC voltage output selector and the output of which is connected to the control input of the DC-pulse voltage converter.

The following features are common to the second proposed embodiment and the prototype:
 a DC voltage source;
 a DC-pulse voltage converter, the inputs of which are connected to the outputs of the DC voltage source;
 a pulse voltage-DC converter having a positive output for connection to one of the outputs of the load;
 a regulator, having a first input for connection to the other output of the load;

a proportional regulator, one output of which is connected to the control (second) input of the regulator;

a DC output voltage selector, the corresponding outputs of which are connected to the outputs of the DLC filter;

a control circuit, the first input of which is connected to the output of the DC output voltage selector.

The technical result that cannot be attained with any of the above analogous technical solutions is ensuring stable DC voltage on the load over a wider range of output voltages with a substantial reduction in the magnitude of the pulsed component in the output voltage and output current.

The aforementioned technical result is unattainable, in the known-art devices for analogous purposes, because the issues of ensuring stable DC voltage on the load over a wider range of output voltages, whilst substantially reducing the magnitude of the pulsed component in output voltage and current, were not given the attention they warranted, because it was believed that the range of stable DC voltage obtained on the load and the magnitude of the pulsed component of the output voltage and current completely satisfied current requirements.

Taking into account the characteristics and an analysis of the analogous prior-art solutions, it can be concluded that the objective of providing devices for obtaining stable DC current on a load over a wider range of output voltages, whilst substantially reducing the magnitude of the pulsed component in the output voltage and current, remains current even today.

DETAILED DESCRIPTION OF THE INVENTION

According to a first embodiment of the invention, the aforementioned technical result is attained by a device for obtaining DC voltage comprising a DC voltage source, a DC-pulse voltage converter, the inputs of which are connected to the outputs of the DC voltage source; a pulse voltage-DC converter having a positive output for connection to one of the outputs of the load, and the inputs of which are connected to the outputs of the pulse voltage-DC converter; a regulator, having a first input for connection to the other output of the load; a proportional regulator, one output of which is connected to the control (second) input of the regulator; a DC output voltage selector, the corresponding outputs of which are connected to the outputs of the DLC filter; and a control circuit, the first input of which is connected to the output of the DC voltage output selector and the output of which is connected to the control input of the DC-pulse voltage converter, supplied by a feedback node, one output of which is connected to the input of the proportional regulator and the other output of which is connected to the output of the regulator, whilst the second input of the control circuit is connected to the first input of the regulator that is intended for connection to the other output of the load.

According to the first embodiment of the proposed technical solution, by controlling the process of converting DC voltage into pulse voltage by means of the control signal from the output of the control circuit, the inclusion of the feedback node and the connection thereof, as well as the connection of the second input of the control circuit to the first input of the regulator that is intended for connection to the other output of the load makes it possible to convert DC voltage into pulse voltage and obtain pulse voltage with a specific pulse duration, which voltage reaches the inputs of the pulse voltage-DC converter, and, after being appropriately converted and filtered, allows for rectified voltage to be obtained at its output.

This rectified voltage reaches the first input of the regulator via the load; as a result, DC current flows through the load and the regulator. Feedback voltage proportional to the current passing through the load passes from the output of the regulator, through the feedback node, to the input of the proportional regulator. In the proportional regulator, as a result of the action of deep negative feedback, the feedback voltage is compared with the voltage of the output voltage selector, as a result of which control voltage, which passes to the second (control) input of the regulator and ensures that current of the selected magnitude will pass through the load, whilst ensuring the suppression of the pulsed component of the current in the load (and, accordingly, the voltage on the load), forms on the output of the proportional regulator.

To provide the required level of output voltage on the load, the rectified voltage from the load is applied to the output voltage selector, from which part of the aforementioned rectified voltage is passed to the control circuit. As a result of the comparison of part of the rectified voltage with the reference voltage, a control signal is formed in the control circuit, which passes to the control input of the DC-pulse voltage converter. As a result of the above process of controlling the conversion of DC voltage into pulse voltage and supplying pulse voltage formed during the conversion of DC voltage into pulse voltage to the input of the pulse voltage-DC converter, and after the corresponding conversion and filtration, stable rectified voltage is obtained on the load, the size of which is determined by the DC output voltage selector and may be deployed on a large scale of up to hundreds of volts and more.

Thus, stable DC voltage is obtained on the load over a wider range of output voltages, with a substantial reduction of the magnitude of the pulsed component in the output voltage and the output current.

In this way, the aforementioned technical result is attained by the first embodiment of the proposed technical solution.

According to a second embodiment of the invention, the aforementioned technical result is attained by a device for obtaining DC voltage comprising a DC voltage source, a DC-pulse voltage converter, the inputs of which are connected to the outputs of the DC voltage source; a pulse voltage-DC converter having a positive output for connection to one of the outputs of the load; a regulator, having a first input for connection to the other output of the load; a proportional regulator, one output of which is connected to the control (second) input of the regulator; a DC output voltage selector, the corresponding outputs of which are connected to the outputs of the DLC filter; and a control circuit, the first input of which is connected to the output of the DC output voltage selector, supplied by a feedback node, one output of which is connected to the input of the proportional regulator and the other output of which is connected to the output of the regulator, wherein the outputs of the DC-pulse voltage converter are connected to the inputs of the pulse voltage-DC converter via a first galvanic isolation node, the output of the control circuit is connected to the control input of the DC-pulse voltage converter via a second galvanic isolation node, and the second input of the control circuit is connected to the first input of the regulator that is intended for connection to the second output of the load.

According to the second embodiment of the invention, as a result of controlling the process of converting DC voltage into pulse voltage by means of a control signal from the output of the second galvanic isolation node (which ensures that the control signal is transmitted without electrical contact between the control circuit and the DC-pulse voltage converter), and of supplying the pulse voltage formed during the conversion of DC voltage into pulse voltage via the first galvanic isolation node (which ensures the transmission of pulse voltage without electrical contact between the DC-pulse voltage converter and the pulse voltage-DC converter) to the input of the aforementioned pulse voltage-DC converter, the inclusion of a feedback node and the connection thereof, and the connection of the second input of the control circuit to the first input of the regulator that is intended for connection to the other output of the load, and the connection of the outputs of the pulse voltage-DC converter via a first galvanic isolation node, as well as the connection of the output of the control circuit to the control input of the DC-pulse voltage converter via a second galvanic isolation node, allows for DC voltage to be converted into pulse voltage and pulse voltage to be obtained with a specific pulse duration, which passes to the inputs of the pulse voltage-DC converter and, after appropriate conversion and filtration, allows rectified voltage to be obtained at its output.

This rectified voltage reaches the first input of the regulator via the load; as a result, DC current flows through the load and the regulator. Feedback voltage proportional to the current passing through the load passes from the output of the regulator, through the feedback node, to the input of the proportional regulator. In the proportional regulator, as a result of the action of deep negative feedback, the feedback voltage is compared with the voltage of the output voltage selector, as a result of which control voltage, which passes to the second (control) input of the regulator and ensures that current of the selected magnitude will pass through the load, whilst ensuring the suppression of the pulsed component of the current in the load (and, accordingly, the voltage on the load), forms on the output of the proportional regulator.

To provide the required level of output voltage on the load, the rectified voltage from the load is applied to the output voltage selector, from which part of the aforementioned rectified voltage is passed to the control circuit. As a result of the comparison of part of the rectified voltage with the reference voltage, a control signal is formed in the control circuit, which passes via the second galvanic isolation node (which ensures transmission of the control signal without electrical contact between the control circuit and the DC-pulse voltage converter) to the control input of the DC-pulse voltage converter. As a result of the above process of controlling the conversion of DC voltage into pulse voltage and of supplying the pulse voltage formed during the conversion of DC voltage into pulse voltage via the first galvanic isolation node (which ensures the transmission of the pulse voltage without electrical contact between the DC-pulse voltage converter and the pulse voltage-DC converter) to the input of the pulse voltage-DC converter, and following appropriate conversion and filtration, stable rectified voltage is obtained on the load, the size of which is determined by the DC output voltage selector and may be deployed on a large scale of up to a hundred volts and more.

Thus, stable DC voltage is obtained on the load over a wider range of output voltages, with a substantial reduction of the magnitude of the pulsed component in the output voltage and the output current.

In this way, the aforementioned technical result is attained by the second embodiment of the proposed technical solution.

An analysis of the prior-art solutions showed that none of them contained either all of the essential features of each of the embodiments of the invention or the distinguishing features, thus giving rise to the conclusion that the novelty and inventiveness requirements for patentability are met by the embodiments of the device for obtaining DC voltage.

Figure 1:
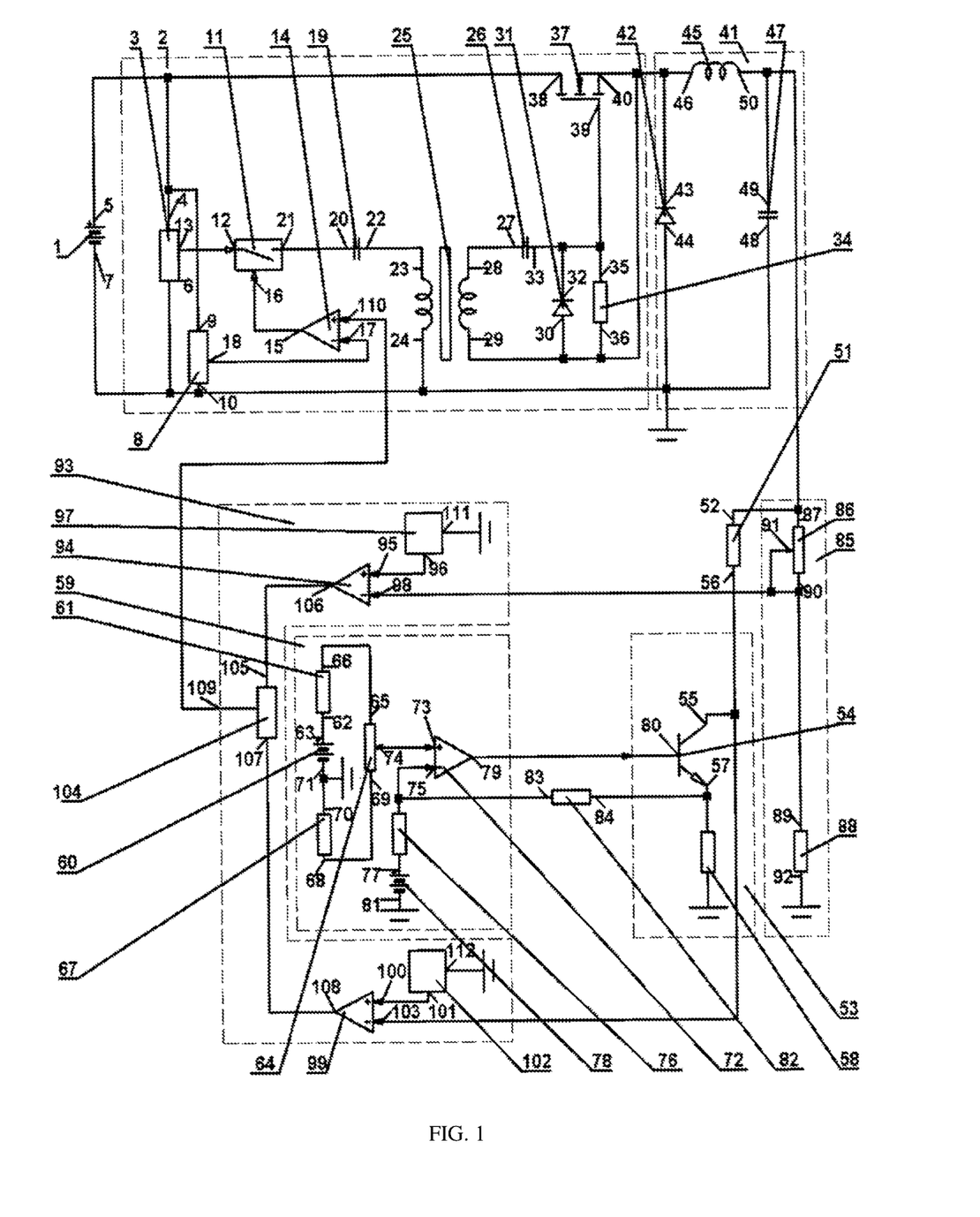
FIGS. 1 and 2 show circuit diagrams of devices for obtaining DC voltage, in accordance with the general teachings of the present invention.
Figure 2:
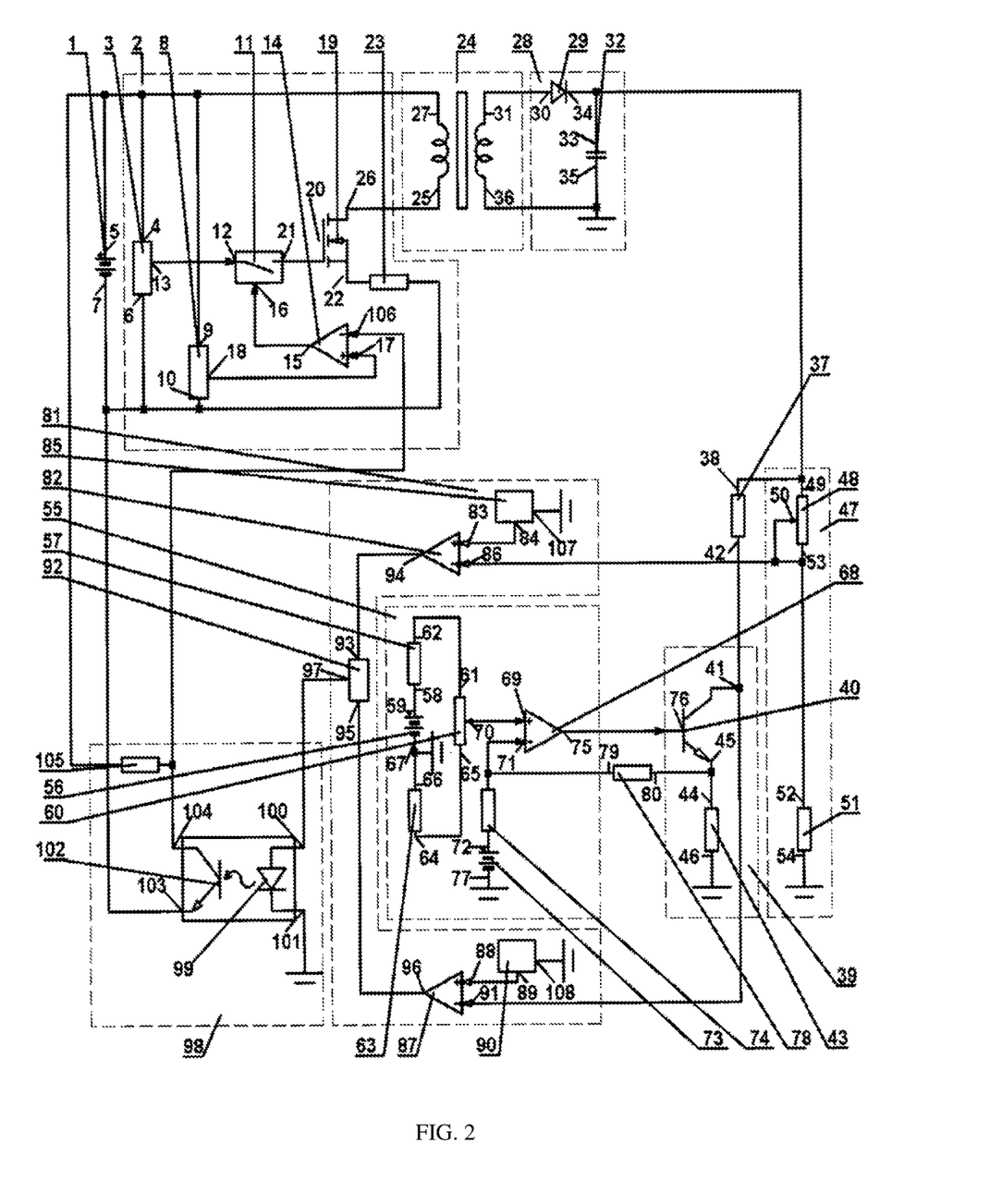
Figure 3:
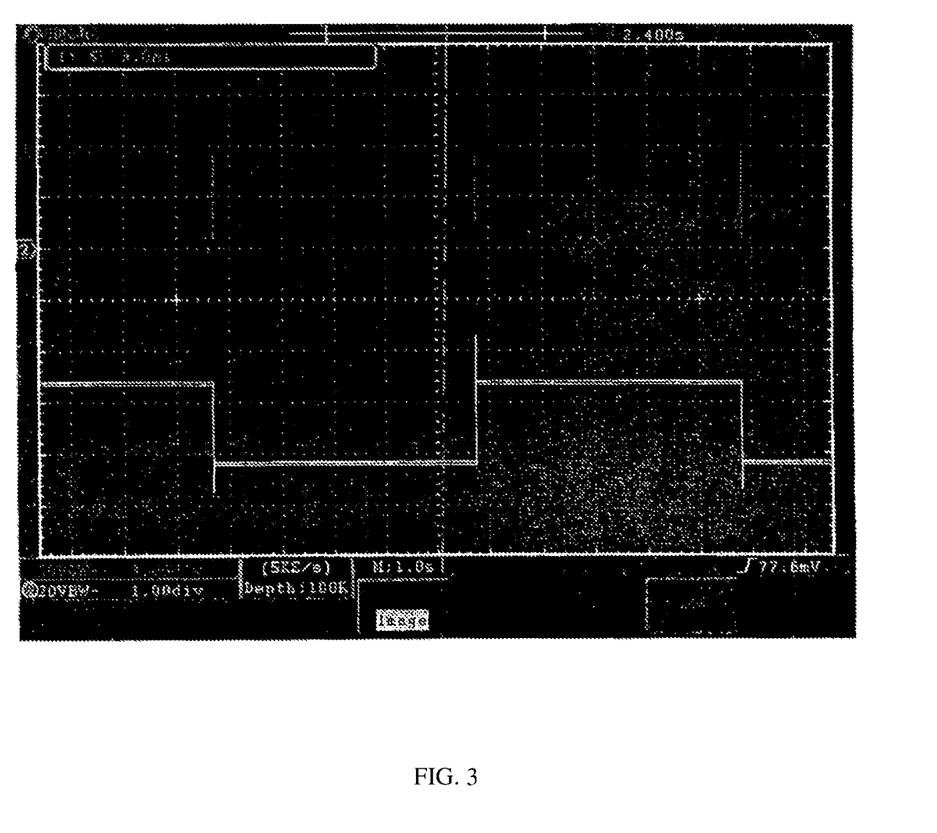
FIGS. 3 and 4 show timing diagrams of the voltages on the load, in accordance with the general teachings of the present invention.
Figure 4:
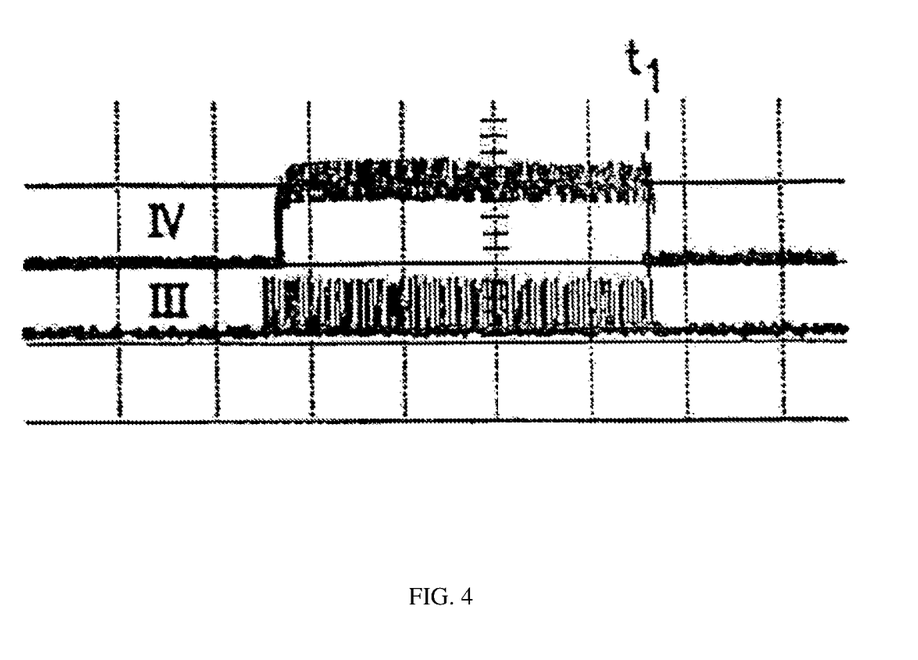

The proposed devices for obtaining DC voltage are explained in detail by reference to the following descriptions and drawings: FIGS. 1 and 2 show circuit diagrams of devices for obtaining DC voltage; FIGS. 3 and 4 show timing diagrams of the voltages on the load, taken from the description of U.S. Pat. No. 6,747,420B2 (prototype) and obtained as a result of experimentation with the second embodiment of the device for obtaining DC voltage according to the invention.

According to the first embodiment of the invention (see FIG. 1), the device for obtaining DC voltage comprises:

a DC voltage source (1) of any known type, e.g., using a full-wave rectifier with a filter;

a DC-pulse voltage converter (2), e.g., in the form of a constant-frequency rectangular impulse generator (3), one output (4) (the first input of the DC-pulse voltage converter (2)) of which is connected to the positive output (5) of the DC voltage source (1) and the other output (6) (second input of the DC-pulse voltage converter (2)) of which is connected to the negative output (7) of the DC voltage source (1); a reference voltage source (8), one output (9) of which is connected to the positive output (5) of the DC voltage source (1) and the other output (10) of which is connected to the negative output (7) of the DC voltage source (1); a controlled switch (11), the input (12) of which is connected to the output (13) of the constant-frequency rectangular pulse generator (3); an operational amplifier (14), one output (15) of which is connected to the control input (16) of the controlled switch (11), and the inverting ("−") input (17) of which is connected to the output (18) of the reference voltage source (8); a first capacitor (19), one plate (20) of which is connected to the output (21) of the controlled switch (11) and the other plate (22) of which is connected via the outputs (23) and (24) of the primary winding of the transformer (25) to the negative output (7) of the DC voltage source (1); a second capacitor (36), one plate (27) of which is connected via the outputs (28) and (29) of the secondary winding (25) of the transformer to the anode (30) of the diode (31), the cathode (32) of which is connected to the other plate (33) of the second capacitor (26); a resistor (34), one output (35) of which is connected to the cathode (32) of the diode (31), and the other output (36) of which is connected to the anode (30) of the diode (31); and a MOSFET (37), the drain (38) of which is connected to the positive output (5) of the DC voltage source (1), the gate (39) of which is connected to the cathode (32) of the diode (31), and the source (40) of which is connected to the anode (30) of the diode (31);

a pulse voltage-DC converter (41), e.g., in the form of a diode (42), the cathode (43) (first input of the pulse voltage-DC converter (41)) is connected to the drain (40) of the MOSFET (37) (first output of the DC-pulse voltage converter (2)) and the anode (44) (second input of the pulse voltage-DC converter (41)) is connected to the second (24) output of the primary winding of the transformer (25) (second output of the DC-pulse voltage converter (2)); a choke (45), one output (46) of which is connected to the cathode (43) of the diode (42); and a capacitor (47), one plate (48) of which is connected to the negative output (7) of the DC voltage source (1) and the other plate (49) of which is connected to the other output (40) of the choke (45), which is the positive output of the pulse voltage-DC converter (41) for connection to one of the outputs of the load;

a load (51), one output (52) of which is connected to the other output (50) of the choke (45) (to the positive output of the pulse voltage-DC converter (41));

a regulator (53), e.g., in the form of a controlled transistor (54), the collector (55) (i.e., the first input of the regulator (53) for connection to the other output (56) of the load (51)) of which is connected to the other output of the load (51) and the emitter (57) of which is connected via the sense resistor (58) to the negative output (7) of the DC voltage source (1);

a proportional regulator (59), e.g., in the form of a DC voltage source (60); a first resistor (61), one output (62) of which is connected to the positive output (63) of the DC voltage source (60); a second (variable) resistor (64), one output (65) of which is connected to the other output (66) of the first resistor (61); a third resistor (67), one output (68) of which is connected to the other output (69) of the second (variable) resistor (64) and the other output (70) of which is connected to the negative output (71) of the DC voltage source (60) as well as the negative output (7) of the DC voltage source (1); and an operational amplifier (72), the non-inverting ("+") input (73) of which is connected to the third output (74) of the second (variable) resistor (64), the inverting ("−") input (75) of which is connected (via the resistor (76)) to the positive output (77) of the reference voltage source (78), and the output (79) (output of the proportional regulator (59)) is connected to the base (80) of the controlled transistor (54) (second input of the regulator (53)), wherein the negative (81) output of the reference voltage source (78) is connected to the negative output (7) of the DC voltage source (1);

a feedback node (82), e.g., in the form of a resistor, one output (83) of which is connected to the input of the proportional regulator (59) (to the inverting ("−") input (75) of the operational amplifier (72)) and the other output (84) of which is connected to the output (57) of the emitter of the controlled transistor (54) (output of the regulator (53));

a DC output voltage selector (85), e.g., in the form of a first (variable) resistor (86), one output (87) of which is connected to the output (50) of the choke (45) of the pulse voltage-DC converter (41); a second resistor (88), one output (89) of which is connected to the other output (90) and the third output (91) of the first (variable) resistor (86) and the other output (92) of which is connected to the negative output (7) of the DC voltage source (1);

a control circuit (93), e.g., in the form of a first operational amplifier (94), the non-inverting ("+") input (95) of which is connected to the positive output (96) of the first reference voltage source (97), and the inverting ("−") input (98) (first input of the control circuit (93)) is connected to the output (91) of the first (variable) resistor (86) (output of the DC output voltage selector (85)); a second operational amplifier (99), the non-inverting ("+") input (100) of which is connected to the positive output (101) of the second reference voltage source (102), and the inverting ("−") input (103) (second input of the control circuit (93)) is connected to the collector (55) of the controlled transistor (54) (first input of the regulator (53) for connection to the other output of the load (51)); a combiner (104), the first input (105) of which is connected to the output (106) of the first operational amplifier (94) and the second input (107) of which is connected to the output (108) of the second operational amplifier (99), and the output (109) (output of the control circuit (93)) of which is connected to the controlled input (110) of the DC-pulse voltage converter (2), which is the non-inverting ("+") input of the operational amplifier (14); wherein the negative output (111) of the first reference voltage source (97) and the negative output (112) of the second reference voltage source (102) are connected to the negative output (7) of the DC voltage source (1).

According to the first embodiment (see FIG. 1), the proposed device for obtaining DC voltage operates as follows.

Upon the arrival of DC voltage from the outputs (5) and (7) of the DC voltage source (1) at the corresponding inputs (4) and (6) of the constant-frequency rectangular impulse generator (3) (inputs of the DC-pulse voltage converter (2)), the constant-frequency rectangular impulse generator (3) generates constant-frequency rectangular impulses, which pass from the output (13) of the constant-frequency rectangular impulse generator (3) to the 'information' input (12) of the controlled switch (11), and, if the contacts of the controlled switch (11) are closed, the constant-frequency rectangular impulses pass from its output (21) over the following path: First capacitor (19)—primary winding (outputs (23) and (24)) of the transformer (25)—secondary winding (outputs (28) and (29)) of the transformer (25)—second capacitor (26) and the parallel diode (31) and resistor (34) on the gate (39) and source (40) of the MOSFET (37).

As a result, the MOSFET (37) converts the DC voltage passing from the output (5) of the DC voltage source (1) to the drain (38) of the MOSFET (37) into pulse voltage, and these pulses pass from the source (40) of the MOSFET (37) to the first input of the pulse voltage DC converter (41) (on the output (46) of the choke (45)), at the output of which (output (50) of the choke (45)), following appropriate conversion (diode (42)) and filtration (choke (45) and capacitor (47)), DC voltage begins to build.

After DC voltage has appeared at the output of the pulse voltage-DC converter (41) (output (50) of the choke (45)), it arrives at the first output (52) of the load (51).

The DC voltage obtained also arrives at the first output (87) of the variable resistor (86), which is the input of the DC output voltage selector (85).

Part of this voltage, which is defined by the position of the slider of the first (variable) resistor (86) passes from the output of the DC output voltage selector (85) (from the output (91) of the resistor (86)) to the inverting ("−") input (98) of the first operational amplifier (94) (the first input of the control circuit (93)), on the non-inverting ("+") input (95) of which voltage arrives from the positive output (96) of the first reference voltage source (97). As a result of a comparison of these voltages on the output (106) of the first operational amplifier (94), a control voltage is formed that passes from the output (106) of the first operational amplifier (94) to the first input (105) of the combiner (105) of the control circuit (93).

From the output (109) of the combiner (104) of the control circuit (93), the control voltage passes to the control input of the DC-pulse voltage converter (2) (to the non-inverting (110) input ("+") of the operational amplifier (14)).

The control voltage that has arrived at the non-inverting (110) input ("+") of the operational amplifier (14) is compared with the voltage of the reference voltage source (8) that passes from its output (18) to the inverting ("−") input (17) of the operational amplifier (14). The voltage obtained as a result of the comparison passes from the output (15) of the operational amplifier (14) to the control input (16) of the controlled switch (11), which either closes or opens its contacts and thus changes the load factor of the pulses arriving at the gate (39) of the MOSFET (37) of the DC-pulse voltage converter (2) via the following path: First capacitor (19)—primary winding of the transformer (25)—secondary winding of the transformer (25)—second capacitor (26) and parallel diode (31) and resistor (34).

When the voltage on the load (51) increases beyond the selected level, growing DC voltage forms on the output (91) of the resistor (86) (output of the DC output voltage selector (85), and, after it is compared with the voltage of the first reference voltage source (97) of the control circuit (93), decreasing control voltage is formed on the output of the operational amplifier (94), which passes via the combiner (104) to the non-inverting (110) input ("+") of the operational amplifier (14) of the DC-pulse voltage converter (2)). As a result of the comparison of the decreasing control voltage with the voltage of the reference voltage source (8), logical zero voltage acts on the control input (16) of the controlled switch (11), causing the contacts of the controlled switch (11) to open. Thus, the load factor of the constant-frequency rectangular impulses increases over the following path: First capacitor (19)—primary winding of the transformer (25)—secondary winding of the transformer (25)—second capacitor (26) and parallel diode (31) and resistor (34)—to the gate (39) of the MOSFET (37), as a result of which, after they pass from the source (40) of the MOSFET (37) to the input of the pulse voltage-DC converter (41) (output (46) of the choke (50)) and are transformed into DC voltage, the DC voltage on the load (51) decreases to the selected level.

If the voltage on the load (51) decreases below the selected level, all of the control voltage is formed with the inverse value, causing the contacts of the controlled switch (11) to close, the load factor of the constant-frequency rectangular impulses to increase, and the DC voltage on the load (51) increases to the selected level.

Thus, the DC voltage on the load (51) is stabilised (with small pulses) at the selected level, which is determined by the DC output voltage selector (85) and may be set in a wide range of up to hundreds of volts and more.

When rectified voltage reaches the load (51) from the output of the pulse voltage-DC converter (41) (output (50) of the choke (45)), load current passes through the load (51) and the subsequently powered-on controlled transistor (54) and sensing resistor (58) of the regulator (53), causing a voltage drop at the sensing resistor (58). This voltage drop passes through the feedback node (82) to the inverting ("−") input (75) of the operational amplifier (72) of the proportional regulator (59) and is combined with the voltage of the reference voltage source (78) of the proportional regulator (59), which passes via the fourth resistor (76) of the proportional regulator (59) to the same inverting ("−") input (75) of the operational amplifier (72). Voltage from the output current selector of the proportional regulator (59) (obtained as a result of the splitting of the voltage of the DC voltage source (60) between the first (61), second (variable) (64), and third (67) resistors of the output current selector of the proportional regulator (59)) arrives at the non-inverting ("+") input (73) of the operational amplifier (72) of the proportional regulator (59) from the output (74) of the second (variable) resistor (64) of the proportional regulator (59). As a result of the comparison of the voltage on the non-inverting ("+") input (73) and the inverting ("−") input (75) of the operational amplifier (72), negative feedback control voltage is formed on the output (79) of the operational amplifier (72) and passes to the base (80) of the controlled transistor (54) (second input of the regulator (53)).

In the event of an increase in the current flowing through the load (51), the voltage drop on the variable resistor (58) of the regulator (53) increases. Meanwhile, the voltage on the inverting ("−") input (75) of the operational amplifier (72) of the proportional regulator (59) increases, and, accordingly, the control voltage on the output (79) of the operational amplifier (72) of the proportional regulator (59) that passes to the base (80) of the controlled transistor (54) (input of the regulator (53)) decreases, and reduces the current flowing through the controlled transistor (54), thus suppressing the pulsed component of the current in the load (51).

In the event of a decrease in the current flowing through the load (51), the voltage drop on the sensing resistor (58) of the regulator (53) decreases, and, accordingly, the control voltage on the output (79) of the operational amplifier (72) of the proportional regulator (59) increases, causing the current passing through the controlled transistor (54) and the load (51) to increase to the selected level. This also ensures the suppression of the pulsed component in the output current and output voltage.

If the DC voltage (passing from the output (74) of the second (variable) resistor (64) of the output current selector and formed, due to the movement of the slider of the second (variable) resistor (64) as a result of DC current flowing over the path—positive output (63) of the DC voltage source (60), first resistor (61), second (variable) resistor (64), third resistor (67), negative output (71) of the DC voltage source (60)) on the non-inverting ("+") input (73) of the operational amplifier (72) of the proportional regulator (59) increases, the control voltage at the output (79) of the operational amplifier (72) of the proportional regulator (59) will also increase. When this increasing control voltage reaches the base (80) of the controlled transistor (54) (second input of the regulator (53)), the current flowing through the controlled transistor (54), and subsequently through the load (51) and the sensing resistor (58) of the regulator (53) increases. Meanwhile, the increasing control voltage from the sensing resistor (58) (from the output of the regulator (53)) passes via the feedback node (82) to the inverting ("−") input (75) of the operating amplifier (72) of the proportional regulator (59) and increases until the voltage on the inverting ("−") input (75) of the operational amplifier (72) is equal to the voltage on the non-inverting ("+") input (73) of the operational amplifier (72) originating from the output current selector. And this occurs whilst the load current is increasing, the magnitude of which is determined by the DC voltage level originating from the output (74) of the second (variable) resistor (64) of the output current selector.

Thus, the DC current through the load (51) is stabilised (due to the effect of the negative feedback through the feedback node (82)) with small pulses at the level specified by the output current selector.

When current flows through the load (51) and the subsequently powered-on controlled transistor (54) and sensing resistor (58) of the regulator, the power at the collector (55)-emitter (57) junction of the controlled transistor (54) dissipates in proportion to the current through the controlled transistor (54) and the voltage drop at the junction. The voltage from the collector (55) of the controlled transistor (54) passes to the inverting ("−") input (103) of the second operational amplifier (99) of the control circuit (93), at the non-inverting ("+") input (100) of which voltage arrives from the second reference voltage source (102) of the control circuit (93). As a result of the comparison of these voltages at the output (108) of the second operational amplifier (99), a control voltage is formed that passes to the second input (107) of the combiner (104) of the control circuit (93).

From the output (109) of the combiner (104) (from the output of the control circuit (93)), the control voltage passes to the control input of the DC-pulse voltage converter (2) (to the non-inverting (110) input ("+") of the operational amplifier (14)).

The control voltage that has arrived at the non-inverting (110) input ("+") of the operational amplifier (14) is compared with the voltage of the DC voltage source (8) that passes from its output (18) to the inverting ("−") input (17) of the operational amplifier (14). The voltage obtained as a result of the comparison passes from the output (15) of the operational amplifier (14) to the control input (16) of the controlled switch (11), which either closes or opens its contacts and thus changes the load factor of the pulses arriving at the gate (39) of the MOSFET (37) of the DC-pulse voltage converter (2).

If the voltage drop at the collector (55)-emitter (57) junction of the controlled transistor (54) increases beyond the selected level, after comparison with the voltage of the second reference voltage source (102) of the control circuit (93), decreasing control voltage will form at the output of the operational amplifier (99), which will pass via the combiner (104) to the non-inverting (110) input ("+") of the operational amplifier (14). As a result of the comparison of the decreasing control voltage with the voltage of the reference voltage source (8), logical zero voltage acts on the control input (16) of the controlled switch (11), causing the contacts of the controlled switch (11) to open. Thus, the load factor of the constant-frequency rectangular impulses increases over the following path: First capacitor (19)—primary winding of the transformer (25)—secondary winding of the transformer (25)—second capacitor (26) and parallel diode (31) and resistor (34)—to the gate (39) of the MOSFET (37), as a result of which, after they pass from the source (40) of the MOSFET (37) to the input of the pulse voltage-DC converter (41) (output (46) of the choke (45)) and are transformed into DC voltage, the voltage drop at the collector (55)-emitter (57) junction of the controlled transistor (54) of the regulator (53) decreases to the selected level, which is the lowest possible level at which the functionality of the controlled transistor (54) can be guaranteed. Meanwhile, the power that dissipated at the collector (55)-emitter (57) junction of the controlled transistor (54) is the lowest possible power at the selected load current.

Thus, the DC voltage at the collector (55)-emitter (57) junction of the controlled transistor (54) is stabilised at a level that is the lowest possible at which the functionality of the controlled transistor (54) can be guaranteed and is determined by the voltage of the second reference voltage source (102), which is part of the control circuit (93), thus ensuring dissipation power at the collector (55)-emitter (57) junction of the controlled transistor (54), i.e., minimal energy loss.

Accordingly, according to the first embodiment, the proposed device for obtaining DC voltage, by including negative feedback between the regulator and the proportional regulator, ensures stabile DC voltage on the load over a wider range of output voltages, whilst substantially reducing the magnitude of the pulsed component of the output voltage and output current with minimal energy loss.

According to the second embodiment of the invention (see FIG. 2), the proposed device for obtaining DC voltage comprises:

a DC voltage source (1) of any known type, e.g., using a full-wave rectifier with a filter;

a DC-pulse voltage converter (2), e.g., in the form of a constant-frequency rectangular impulse generator (3), one output (4) (the first input of the DC-pulse voltage converter (2)) of which is connected to the positive output (5) of the DC voltage source (1) and the other output (6) (second input of the DC-pulse voltage converter (2)) of which is connected to the negative output (7) of the DC voltage source (1); a reference voltage source (8), one output (9) of which is connected to the positive output (5) of the DC voltage source (1) and the other output (10) of which is connected to the negative output (7) of the DC voltage source (1); a controlled switch (11), the input (12) of which is connected to the output (13) of the constant-frequency rectangular pulse generator (3); an operational amplifier (14), the output (15) of which is connected to the control input (16) of the controlled switch (11), and the non-inverting ("+") input (17) of which is connected to the output (18) of the reference voltage source (8); and a MOSFET (19), the gate (20) of which is connected to the output (21) of the controlled switch (11) and the source (22) of which is connected via the resistor (23) to the negative output (7) of the DC voltage source (1);

a first galvanic isolation node, e.g., in the form of a transformer (24), one output (25) of the primary winding of which is connected to the drain (26) of the MOSFET (19) and the other output (27) of the primary winding of which is connected to the positive output (5) of the DC voltage source (1);

a pulse voltage-DC voltage converter (28), e.g., in the form of a diode (29), the anode (30) (input of the pulse voltage-DC converter (28)) of which is connected to one of the outputs (31) of the secondary winding of the transformer (24) of the first galvanic isolation node, and a capacitor (32), one plate (33) of which is connected to the cathode (34) of the diode (29) (wherein the cathode (34) of the diode (29) is the positive output of the pulse voltage-DC converter (28) for connection to one of the outputs of the load) and the other output (35) of which is connected to the other output (36) of the secondary winding of the transformer (24) of the first galvanic isolation node and to the body (shared point of connection of the components of the output part of the device, galvanically isolated from the input part);

a load (37), one output (38) of which is connected to the positive output (cathode (34) of the diode (29)) of the pulse voltage-DC converter (28) that is intended for connection to one of the outputs (38) of the load (37);

a regulator (39), e.g., in the form of a controlled transistor (40), the collector (41) (first input of the regulator (39), for connection to the other output (42) of the load (37)) of which is connected (sic), and a sensing resistor (43), one output (44) of which is connected to the emitter (45) of the transistor (40) and the other output (46) of which is connected to the body (shared point of connection of the components of the output part of the device, galvanically isolated from the input part);

a DC output voltage selector (47), e.g., in the form of a first (variable) resistor (48), one output (49) of which is connected to the positive output (cathode (34) of the diode (29)) of the pulse voltage-DC voltage converter (28), for connection to one of the outputs (38) of the load (37) and a second resistor (51), one output (52) of which is connected to the other output (53) and the third output (50) first (variable) resistor (48), and the other output of which is connected to the body (shared point of connection of the components of the output part of the device, galvanically isolated from the input part);

a proportional regulator (55), e.g., in the form of a DC voltage source (56); a first resistor (57), one output (58) of which is connected to the positive output (59) of the DC voltage source (56); a second (variable) resistor (60), one output (61) of which is connected to the other output (62) of the first resistor (57); a third resistor (63), one output (64) of which is connected to the other output (65) of the second (variable) resistor (60) and the other output (66) of which is connected to the negative output (67) of the DC voltage source (56); and an operational amplifier (68), the non-inverting ("+") input (69) of which is connected to the third output (70) of the second (variable) resistor (60), the inverting ("−") input (71) of which is connected (via the resistor (74)) to the positive output (72) of the reference voltage source (73), and the output (75) (output of the proportional regulator (55)) is connected to the base (76) of the controlled transistor (40) (second input of the regulator (39)), wherein the negative output (77) of the reference voltage source (73) is connected to the body (shared point of connection of the components of the output part of the device, galvanically isolated from the input part);

a feedback node (78), e.g., in the form of a resistor, one output (79) of which is connected to the input of the proportional regulator (55) (to the inverting ("−") input (71) of the operational amplifier (68)) and the other output (80) of which is connected to the output (45) of the emitter of the controlled transistor (40) (output of the regulator (39));

a control circuit (81), e.g., in the form of a first operational amplifier (82), the non-inverting ("+") input (83) of which is connected to the positive output (84) of the first reference voltage source (97), and the inverting ("−") input (86) (first input of the control circuit (81)) is connected to the output of the DC output voltage selector (47) (output (50) of the first (variable) resistor (48) of the DC output voltage selector (47)); a second operational amplifier (87), the non-inverting ("+") input (88) of which is connected to the positive output (89) of the second DC reference voltage source (90), and the inverting ("−") input (91) (second input of the control circuit (81)) is connected to the collector (41) of the controlled transistor (40) (first input of the regulator (39) for connection to the other output (42) of the load (37)); a combiner (92), the first input (93) of which is connected to the output (94) of the first operational amplifier (82) and the second input (95) of which is connected to the output (96) of the second operational amplifier (87); wherein the negative output (107) of the first reference voltage source (85) and the negative output (108) of the second reference voltage source (90) are connected to the body (shared point of connection of the components of the output part of the device, galvanically isolated from the input part), and the output (97) of the combiner (92) is the output of the control circuit (81);

a second galvanic isolation node (98), e.g., in the form of a semiconducting LED (99), the anode (100) (input of the second galvanic isolation node (98)) is connected to the output (97) of the combiner (92) of the control circuit (81), and the cathode (101) of which is connected to the body (shared point of connection of the components of the output part of the device, galvanically isolated from the input part); and a phototransistor (102), one output (103) of which is connected to the negative output (7) of the DC voltage source (1) and the other output (104) of which is connected, via the resistor (105), to the positive output (5) of the DC voltage source (1), as well as the control input of the DC-pulse voltage converter (2), i.e., to the inverting (106) input ("−") of the operational amplifier (14) of the DC-pulse voltage converter (2).

According to the second embodiment (see FIG. 2), the proposed device for obtaining DC voltage operates as follows.

When DC voltage from the outputs (5) and (7) of the DC voltage source (1) arrives at the corresponding inputs (4) and (6) of the constant-frequency rectangular impulse generator (3) (inputs of the DC-pulse voltage converter (2)), the constant-frequency rectangular impulse generator (3) generates constant-frequency rectangular impulses that pass from the output (13) of the constant-frequency rectangular impulse generator (3) to the 'information' input (12) of the controlled switch (11), and, if the contacts of the controlled switch (11) are closed, the constant-frequency rectangular impulses pass from its output (21) to the gate (20) of the MOSFET (19), and, from its drain (26), to the output (25) of the primary winding of the transformer (24) of the first galvanic isolation node.

When constant-frequency rectangular impulses appear at the outputs (31, 36) of the secondary winding of the transformer (24) of the first galvanic isolation node and arrive at the inputs (the anode (30) of the diode (29) and the plate (35) of the capacitor (32)) of the pulse voltage-DC converter (28), they are transformed into DC voltage. After DC voltage appears at the positive output (cathode (34) of the diode (29)) of the pulse voltage-DC converter), it arrives at the first output (38) of the load (37) and the first output (49) of the variable resistor (48), which is the input of the DC output voltage selector (47).

Part of this voltage, which is defined by the position of the slider of the first (variable) resistor (48) passes from the output of the DC output voltage selector (47) (from the output (50) of the resistor (48)) to the inverting ("−") input (86) of the first operational amplifier (82) (the first input of the control circuit (81)), on the non-inverting ("+") input (83) of which voltage arrives from the positive output (84) of the first reference voltage source (85). As a result of a comparison of these voltages on the output (94) of the first operational amplifier (82), a control voltage is formed that passes from the output (94) of the first operational amplifier (82) to the first input (93) of the combiner (92) of the control circuit (81).

From the output (97) of the combiner (92) of the control circuit (81), the control voltage passes via the second galvanic isolation node (98) to the control input of the DC-pulse voltage converter (2) (to the non-inverting (106) input ("+") of the operational amplifier (14)).

The control voltage that has arrived at the inverting (106) input ("−") of the operational amplifier (14) is compared with the voltage of the reference voltage source (8) that passes from its output (18) to the non-inverting ("+") input (17) of the operational amplifier (14). The voltage obtained as a result of the comparison passes from the output (15) of the operational amplifier (14) to the control input (16) of the controlled switch (11), which either closes or opens its contacts and thus changes the load factor of the pulses arriving at the gate (20) of the MOSFET (19) of the DC-pulse voltage converter (2).

When the voltage on the load (37) increases beyond the selected level, growing DC voltage forms on the output (50) of the resistor (48) (output of the DC output voltage selector (47)), and, after it is compared with the voltage of the first reference voltage source (85) of the control circuit (81), decreasing control voltage is formed on the output of the operational amplifier (94), which passes second galvanic isolation node (98). Meanwhile, at the output (104) of the second galvanic isolation node (98), increasing control voltage is formed, which passes to the inverting (106) input ("−") of the operational amplifier (14) of the DC-pulse voltage converter (2). As a result of the comparison of the decreasing control voltage with the voltage of the reference voltage source (8) (output 18), logical zero voltage acts on the control input (16) of the controlled switch (11), causing the contacts of the controlled switch (11) to open. Accordingly, there is an increase in the load factor of the constant-frequency rectangular impulses on the outputs (31, 36) of the secondary winding of the transformer (24) of the first galvanic isolation node, and after they reach the inputs of the DC-pulse voltage converter (28) and are converted into DC voltage, the DC voltage on the load (37) decreases.

If the voltage on the load (37) decreases below the selected level, all of the control voltage is formed with the inverse value, causing the contacts of the controlled switch (11) to close, the load factor of the constant-frequency rectangular impulses at the outputs (31, 36) of the secondary winding of the transformer (24) of the first galvanic isolation node to decrease, and the DC voltage on the load (37) increases to the selected level.

Thus, the DC voltage on the load (37) is stabilised (with small pulses) at the selected level, which is determined by the DC output voltage selector (47) and may be set in a wide range of up to hundreds of volts and more.

When rectified voltage reaches the load (37) from the positive output of the pulse voltage-DC converter (28) (output (34) of the diode (29)), load current passes through the load (37) and the subsequently powered-on controlled transistor (40) and sensing resistor (43) of the regulator (39), causing a voltage drop at the sensing resistor (43). This voltage drop passes through the feedback node (78) to the inverting ("−") input (71) of the operational amplifier (68) of the proportional regulator (55) and is combined with the voltage of the reference voltage source (73) of the proportional regulator (55), which passes via the fourth resistor (74) of the proportional regulator (55) to the same inverting ("−") input (71) of the operational amplifier (68). Voltage from the output current selector of the proportional regulator (55) (obtained as a result of the splitting of the voltage of the DC voltage source (56) between the first (57), second (variable) (60), and third (63) resistors of the output current selector of the proportional regulator (55)) arrives at the non-inverting ("+") input (69) of the operational amplifier (68) of the proportional regulator (55) from the output (70) of the second (variable) resistor (60) of the proportional regulator (55). As a result of the comparison of the voltage on the non-inverting ("+") input (69) and the inverting ("−") input (71) of the operational amplifier (68), negative feedback control voltage is formed on the output (75) of the operational amplifier (68) and passes to the base (76) of the controlled transistor (40) (second input of the regulator (39)).

In the event of an increase in the current flowing through the load (37), the voltage drop on the variable resistor (43) of the regulator (39) increases. Meanwhile, the voltage on the inverting ("−") input (71) of the operational amplifier (68) of the proportional regulator (55) increases, and, accordingly, the control voltage on the output (75) of the operational amplifier (68) of the proportional regulator (55) that passes to the base (76) of the controlled transistor (40) (second input of the regulator (39)) decreases, and reduces the current flowing through the controlled transistor (40), thus suppressing the pulsed component of the current in the load (37).

In the event of a decrease in the current flowing through the load (37), the voltage drop on the sensing resistor (43) of the regulator (39) decreases, and, accordingly, the control voltage on the output (75) of the operational amplifier (68) of the proportional regulator (55) increases, causing the current passing through the controlled transistor (40) and the load (37) to increase to the selected level. This also ensures the suppression of the pulsed current component in the output current and output voltage.

If the DC voltage (passing from the output (70) of the second (variable) resistor (60) of the output current selector and formed, due to the movement of the slider of the second (variable) resistor (60) as a result of DC current flowing over the path—positive output (59) of the DC voltage source (56), first resistor (57), second (variable) resistor (60), third resistor (63), negative output (67) of the DC voltage source (56)) on the non-inverting ("+") input (69) of the operational amplifier (68) of the proportional regulator (55) increases, the control voltage at the output (75) of the operational amplifier (68) of the proportional regulator (55) will also increase. When this increasing control voltage reaches the base (76) of the controlled transistor (40) (second input of the regulator (39)), the current flowing through the controlled transistor (40), and subsequently through the load (37) and the sensing resistor (43) of the regulator (39) increases. Meanwhile, the increasing voltage from the sensing resistor (43) (from the output of the regulator (39)) passes via the feedback node (78) to the inverting ("−") input (71) of the operating amplifier (68) of the proportional regulator (55) and increases until the voltage on the inverting ("−") input (71) of the operational amplifier (68) is equal to the voltage on the non-inverting ("+") input (69) of the operational amplifier (68) originating from the output current selector. And this occurs whilst the load current is increasing, the magnitude of which is determined by the DC voltage level originating from the output (70) of the second (variable) resistor (60) of the output current selector.

Thus, the DC current through the load (37) is stabilised (due to the effect of the negative feedback through the feedback node (78)) with small pulses at the level specified by the output current selector.

When current flows through the load (37) and the subsequently powered-on controlled transistor (40) and sensing resistor (43) of the regulator (39), the power at the collector (41)-emitter (45) junction of the controlled transistor (40) dissipates in proportion to the current through the controlled transistor (40) and the voltage drop at the junction. The voltage from the collector (41) of the controlled transistor (40) passes to the inverting ("−") input (91) of the second operational amplifier (87) (second input of the control circuit (81)), at the non-inverting ("+") input (88) of which voltage arrives from the positive output (89) of the second reference voltage source (90). As a result of a comparison of these voltages on the output (96) of the second operational amplifier (87), a control voltage is formed that passes from the output (96) of the second operational amplifier (87) to the second input (95) of the combiner (92) of the control circuit (81).

From the output (97) of the combiner (92) (the output of the control circuit (81)), the control voltage passes via the second galvanic isolation node (98) to the control input of the DC-pulse voltage converter (2) (to the inverting (106) input ("−") of the operational amplifier (14)).

The control voltage that has arrived at the inverting (106) input ("−") of the operational amplifier (14) is compared with the voltage of the DC voltage source (8) that passes from its output (18) to the non-inverting ("+") input (17) of the operational amplifier (14). The voltage obtained as a result of the comparison passes from the output (15) of the operational amplifier (14) to the control input (16) of the controlled switch (11), which either closes or opens its contacts and thus changes the load factor of the pulses arriving at the gate (20) of the MOSFET (19) of the DC-pulse voltage converter (2).

If the voltage drop at the collector (41)-emitter (45) junction of the controlled transistor (40) increases beyond the selected level, after comparison with the voltage of the second reference voltage source (90), decreasing control voltage will form at the output (96) of the operational amplifier (87), which will pass to the second (98) galvanic isolation node. Meanwhile, at the output (104) of the second galvanic isolation node (98), increasing control voltage is formed, which passes to the inverting (106) input ("−") of the operational amplifier (14) of the DC-pulse voltage converter (2).

As a result of the comparison of the increasing control voltage with the voltage at the output (18) of the reference voltage source (8), logical zero voltage acts on the control input (16) of the controlled switch (11), causing the contacts of the controlled switch (11) to open. Accordingly, there is an increase in the load factor of the constant-frequency rectangular impulses on the outputs (31, 36) of the secondary winding of the transformer (24) of the first galvanic isolation node, and after they reach the inputs of the DC-pulse voltage converter (28) and are converted into DC voltage, the DC voltage drop at the collector (41)—emitter (45) junction of the controlled transistor (40) decreases to the selected level, which is the minimum possible level to guarantee the functionality of the controlled transistor (40). Meanwhile, the power that dissipated at the collector (41)-emitter (45) junction of the controlled transistor (40) is the lowest possible power at the selected load current.

Thus, the DC voltage at the collector (41)—emitter (45) junction of the controlled transistor (40) is stabilised at a level that is the lowest possible at which the functionality of the controlled transistor (40) can be guaranteed and is determined by the voltage of the second reference voltage source (90), which is part of the control circuit (81), thus ensuring dissipation power at the collector (41)-emitter (45) junction of the controlled transistor (40), i.e., minimal energy loss.

Accordingly, according to the second embodiment, the proposed device for obtaining DC voltage, by including negative feedback between the regulator and the proportional regulator, ensures stabile DC voltage on the load over a wider range of output voltages, whilst substantially reducing the magnitude of the pulsed component of the output voltage and output current with minimal energy loss.

To confirm that more stable DC voltage is obtained by the proposed embodiments of the invention, experiments were conducted, the results of which are explained by means of timing diagrams of the voltage on the load, see FIG. 3 (a device according to the second embodiment of the invention was produced).

A timing diagram of voltage on a load taken from the description of U.S. Pat. No. 6,747,420B2 is shown in FIG. 4.

A comparison of the timing diagrams shows that the stability of the DC voltage on the load is substantially increased compared to the solution shown in U.S. Pat. No. 6,747,420B2, and the pulsed component is reduced practically to nil.

This also confirms that the aforementioned technical result has been obtained.

The function blocks of the device may be provided in various ways. Thus, the transistor of the regulator may be either bipolar, a MOSFET, or an IGBT; the DC-pulse voltage converter may be provided in the form of a pulse-width modulator microcircuit, etc.

The output voltage may be controlled by varying the corresponding reference voltage of the control circuit, e.g., using a pulse-width modulation-control voltage converter, or by converting the code of the control protocol (e.g., DALI) to control voltage, or any other conversion of control effect to control voltage.

The same applies to the output current selector.

In any embodiment of the function blocks of the device, stable DC voltage will be obtained on the load over a wider range of output voltages with a substantial reduction of the pulsed component of the output voltage and output current, i.e., the aforementioned technical result will be obtained.

The above technical result is obtained both with galvanic isolation between the input and output of the device and without such isolation.

The invention claimed is:

1. A device for obtaining DC voltage, comprising:
   a DC voltage source;
   a DC-voltage-to-pulse voltage converter;
   wherein inputs of the DC-voltage-to-pulse voltage converter are connected to outputs of the DC voltage source;
   a pulse-voltage-to-DC voltage converter having an output for connection to a first terminal of a load;
   a regulator, having a first input connected to a second terminal of the load;
   a proportional regulator having an output which is connected to a second input of the regulator;
   a DC output voltage selector operably associated with outputs of the DC-voltage-to-pulse-voltage converter;
   a control circuit having a first input which is connected to the output of the DC output voltage selector and a second input which is connected to the first input of the regulator which is configured for connection to the second terminal of the load; and
   a feedback circuitry having a first terminal and a second terminal, wherein the first terminal of the feedback circuitry is connected to an input of the proportional regulator and the second terminal of the feedback circuitry is connected to an output of the regulator, wherein the outputs of the DC-voltage-to-pulse-voltage converter are connected to inputs of the pulse-voltage-to-DC-voltage converter via a first galvanic isolation, and wherein an output of the control circuit is connected to a control input of the DC-voltage-to-pulse-voltage converter via a second galvanic isolation.

\* \* \* \* \*